Jan. 21, 1936.  W. S. HEWETT  2,028,668
JOINT FOR CONCRETE PIPES
Filed Dec. 6, 1934
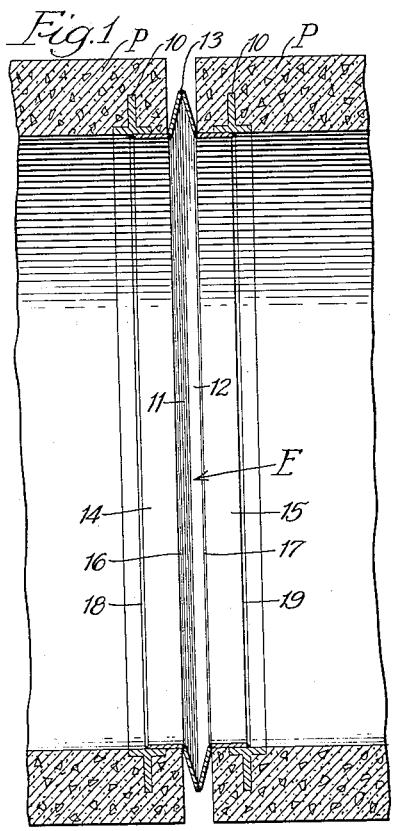
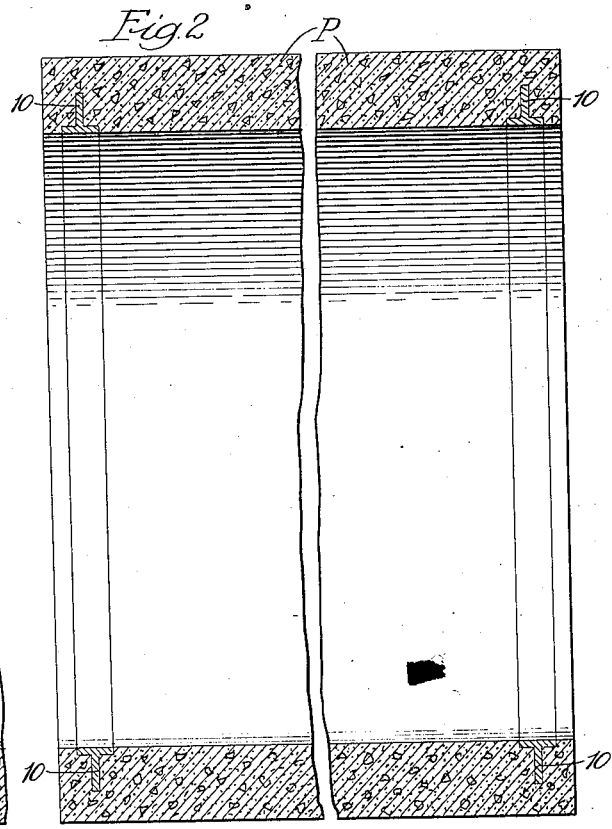
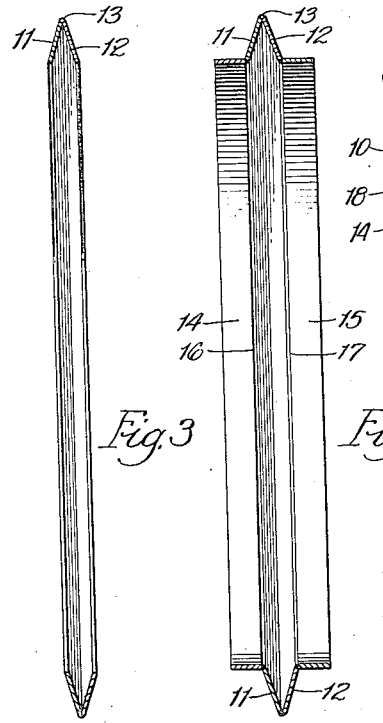
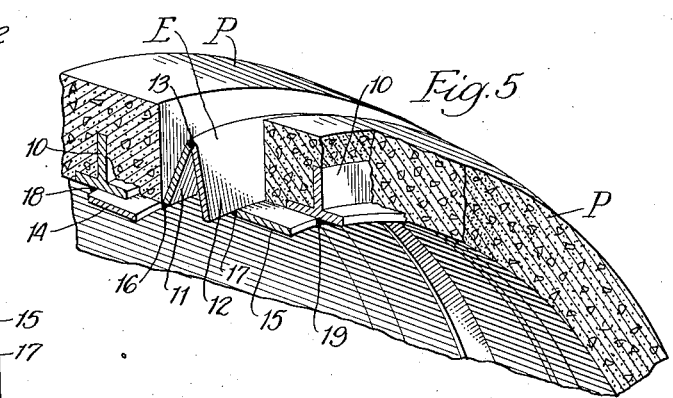
Inventor:
William S. Hewett,
By Banning & Banning
Attys.

Patented Jan. 21, 1936

2,028,668

UNITED STATES PATENT OFFICE 2,028,668

JOINT FOR CONCRETE PIPES

William S. Hewett, Elmhurst, Ill.

Application December 6, 1934, Serial No. 756,305

2 Claims. (Cl. 285—90)

This invention has to do with an expansion joint for concrete pipes or conduits. Pipes of this character may be used for water mains, irrigation systems, sewers, etc. In all such cases it is important that the conduit be made watertight at the joints between sections, and the present improvements are designed to accomplish this as well as facilitate the work of installation. Additionally, the joint of this invention is elastic to provide for expansion and contraction in the conduit line due to temperature changes, or other causes, irrespective of whether or not the applied forces are even at the various points around the meeting ends of the pipe sections.

A further advantage in my present joint is that it may be constructed partly in advance of its installation in the field, thereby simplifying and expediting the operations requisite for its use.

A suggested exemplification of this invention is illustrated in the accompanying drawing wherein—

Figure 1 is a fragmentary sectional view of adjacent ends of two pipe sections complete with the present joint therebetween;

Fig. 2 is a view in section of a pipe section showing base rings anchored near opposite ends thereof;

Fig. 3 is a sectional view of the central angle ring formed of two parts welded together to constitute the movable element of the expansion joint;

Fig. 4 is a similar view showing ring flanges applied to the angled ring; and

Fig. 5 is an enlarged perspective view in section, showing the expansion joint secured to the base rings near the ends of adjacent pipe sections.

The present joint is adapted for installation between adjacent ends of two pipe sections P. As shown, each section is fitted near each of its opposite ends with a continuous metallic base which may take the form of a T-ring 10 having its web embedded radially within the pipe. This base ring not only provides a reinforcement for the pipe itself but provides a desirable base to which the expansion joint may be anchored, as by welding, in the manner shortly to be described.

The expansion joint comprises an angled ring E formed of two united plies or plates of steel 11 and 12 having a continuous connection 13 along their outer edges produced by folding or welding, as the case may be, thereby providing a single ring which is V-shaped in cross section. These plies or plates so joined provide the expansible element of the joint, and may flex as required in response to forces of expansion or contraction exerted lengthwise of the pipe line.

The angled ring E is joined at its base to oppositely extending steel ring flanges 14 and 15. Continuous welds 16 and 17, respectively, connect these flanges to the angled ring, as shown best in Fig. 4, these several welds between the flanges and the angled ring and between the two plates of the angled ring being made desirably in a shop where cutting and welding facilities are most convenient. The joint complete, that is the angled ring with attached flanges, may then be installed between the meeting ends of two pipe sections in the field. In this operation it is necessary only that the flanges of the joint be fitted inside the pipe ends to rest upon the base rings following which the two welds 18 and 19 are made to anchor the flanges thereto. The joint thus made and installed is water-tight.

I claim:

1. An expansion joint for use in securing the ends of two concrete pipe sections in spaced aligned relationship, comprising a ring-shaped reinforcing bar having a radial web embedded in each section with a face of each bar extending substantially flush with the inner surface of a section adjacent the spaced ends thereof, a joining member for said sections comprising a ring having an outwardly extending V-shaped portion adapted to extend between the spaced end of said sections and oppositely extending flanges at the base of said portion adapted to extend within said pipe sections and embrace the inner faces of said reinforcing bars, and means securing each of said flanges to said bars with the ends of said pipe sections abutting the base of said V-shaped portion of said joining member.

2. An expansion joint for use in securing the ends of two concrete sections in spaced aligned relationship, comprising a reinforcing bar having a web embedded in each section so that the bar lies substantially flush with the inner surfaces of the sections adjacent the spaced ends thereof, a substantially V-shaped joining member for said sections adapted to extend outwardly therebetween, said member having oppositely extending flanges at its base adapted to extend into and embrace the inner faces of said bars, and means securing each of said flanges to said bars with the ends of said sections abutting the base of said V-shaped member.

WILLIAM S. HEWETT.